(12) United States Patent
Al-Banna et al.

(10) Patent No.: US 9,203,767 B1
(45) Date of Patent: *Dec. 1, 2015

(54) INTELLIGENT TRAFFIC OPTIMIZER

(71) Applicant: ARRIS Group Inc., Suwanee, GA (US)

(72) Inventors: Ayham Al-Banna, Darien, IL (US); Carol Ansley, Johns Creek, GA (US); Thomas J Cloonan, Lisle, IL (US); Jeffrey J Howe, West Chicago, IL (US)

(73) Assignee: ARRIS Enterprises, Inc., Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/302,126

(22) Filed: Jun. 11, 2014

Related U.S. Application Data

(63) Continuation of application No. 12/426,754, filed on Apr. 20, 2009, now Pat. No. 8,780,709.

(60) Provisional application No. 61/046,265, filed on Apr. 18, 2008.

(51) Int. Cl.
| | |
|---|---|
| *G06F 11/00* | (2006.01) |
| *H04L 12/26* | (2006.01) |
| *H04J 1/16* | (2006.01) |
| *H04J 3/16* | (2006.01) |
| *H04L 12/825* | (2013.01) |
| *H04L 12/801* | (2013.01) |
| *H04L 12/819* | (2013.01) |

(52) U.S. Cl.
CPC ............ *H04L 47/25* (2013.01); *H04L 43/0888* (2013.01); *H04L 47/11* (2013.01); *H04L 47/21* (2013.01)

(58) Field of Classification Search
USPC .................................................. 370/229–238
See application file for complete search history.

(56) References Cited

U.S. PATENT DOCUMENTS

| | | | | |
|---|---|---|---|---|
| 5,748,901 | A * | 5/1998 | Afek et al. | 709/238 |
| 5,936,940 | A * | 8/1999 | Marin et al. | 370/232 |
| 7,072,295 | B1 * | 7/2006 | Benson et al. | 370/230 |
| 2001/0038639 | A1 * | 11/2001 | McKinnon et al. | 370/468 |
| 2003/0174649 | A1 * | 9/2003 | Shankar et al. | 370/235 |
| 2004/0071145 | A1 * | 4/2004 | Ha et al. | 370/395.43 |
| 2005/0068798 | A1 * | 3/2005 | Lee et al. | 365/49 |
| 2006/0215558 | A1 * | 9/2006 | Chow | 370/232 |
| 2008/0165687 | A1 * | 7/2008 | Wang | 370/232 |

* cited by examiner

*Primary Examiner* — Brandon Renner
(74) *Attorney, Agent, or Firm* — Susan R. Payne

(57) ABSTRACT

Bandwidth is assigned to subscribers of a data network by applying logic of one or more network devices to sample bits of information communicated over a network communication medium to identify if there is a network congestion condition or an extremely lightly loaded condition. The maximum bandwidth assigned to a subscriber is below a normative maximum bandwidth assigned to the subscriber if the network is congested and the logic of the one or more network devices identifies the subscriber as a heavy bandwidth user. The maximum bandwidth assigned to a subscriber is above the normative maximum bandwidth if the network is extremely lightly loaded and the subscriber is a heavy bandwidth user.

16 Claims, 4 Drawing Sheets

INTELLIGENT TRAFFIC OPTIMIZER

PRIORITY CLAIM

This application claims priority under 35 USC 119 to USA application No. 61/046,265 filed on Friday, Apr. 18, 2008, which is incorporated herein by reference in its entirety.

BACKGROUND

Multiple System Operators (MSOs) have found that a small percentage of subscribers consume a large percentage of the channel data bandwidth, causing network congestion that affects the quality of service offered to other subscribers. MSOs cannot use application-aware equipment to limit the traffic of heavy users due to network neutrality issues. The heavy users are also complaining that MSOs limit their traffic during congestion periods.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic is a design decision that will vary according to implementation.

An Intelligent Traffic Optimizer (ITO) may be used to limit the usage of heavy subscribers only when network congestion is present. Subscribers are allowed to use as much bandwidth as they desire (less than or equal to SLA Tmax) when the network is lightly loaded. SLA Tmax refers to the Service Level Agreement maximum rate given to the subscriber (i.e., the subscribed rate). This feature applies in both upstream and downstream directions.

Figure 3:
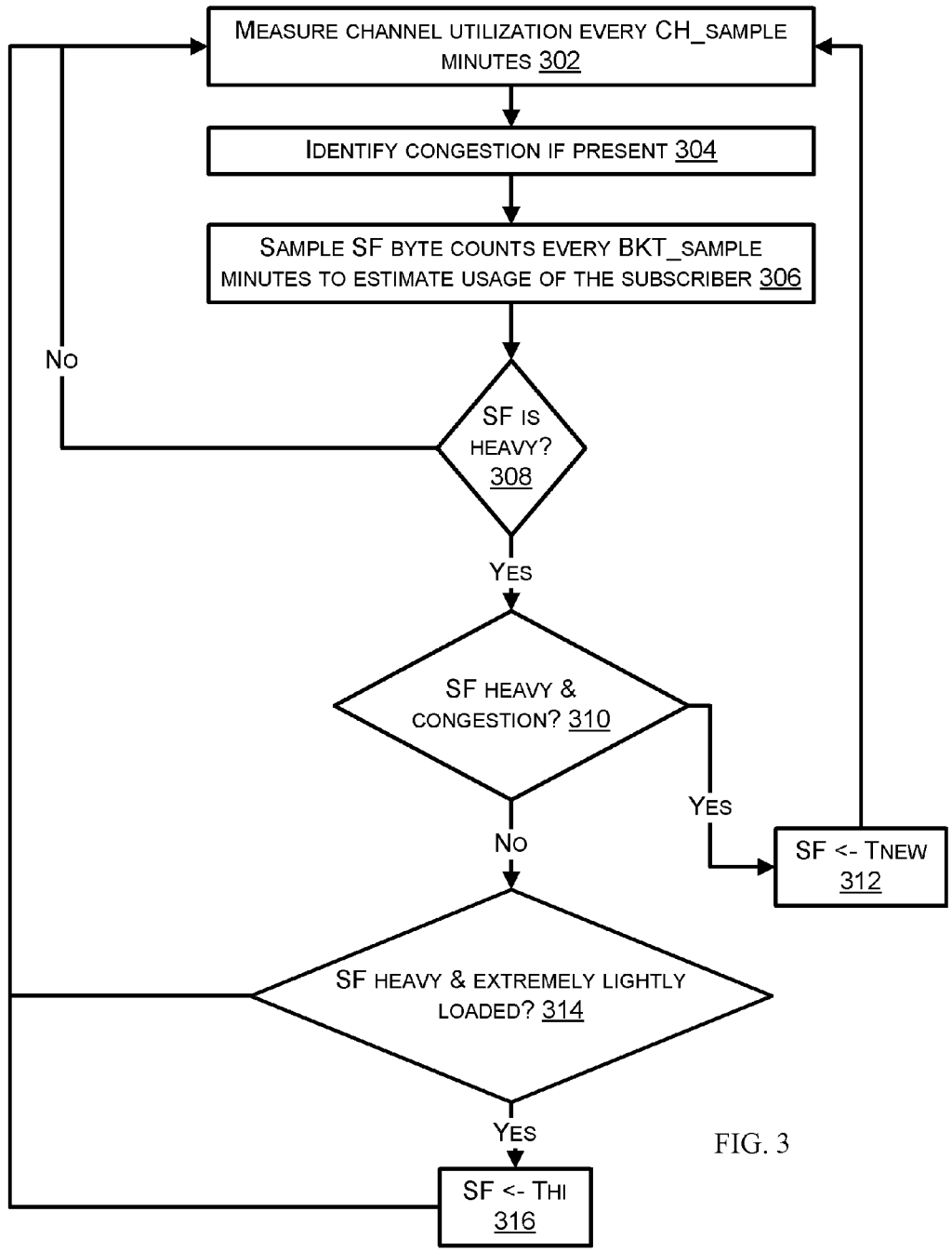
FIG. 3 is a flow chart of an embodiment of a process in which the ITO limits the usage of heavy subscribers at congestion periods and also speeds up service to heavy subscribers when the channel is extremely lightly utilized.

The ITO limits the usage of heavy subscribers at congestion periods through assigning them a new Tmax (Tnew), which is a fractional value of the SLA Tmax. The ITO also speeds up service to heavy subscribers through assigning them a higher Tmax (Thi) when the channel is extremely lightly utilized. The process embodiment described below may be applied in some embodiments of the ITO (See FIG. 3).

302 Measure channel utilization every CH_sample minutes (e.g., 5 minutes).

304 Identify congestion if present.

306 Sample SF byte counts every BKT_sample minutes (e.g., 60 minutes) to estimate usage of the subscriber. All SF's counts need not be sampled simultaneously, sampling counts for all SF's may be done sequentially over BKT_sample minutes.

308 Identify whether SF is heavy or not.

310, 312 If the subscriber is heavy, and there is congestion, assign the subscriber a new Tmax value (Tnew), given by $$T\text{new} = \text{Hvnss\_level} * T\text{max},$$

Where the fraction, Hvnss_level, may be evaluated as described below. In the upstream (US) direction, the Tnew value is used by the mapper, while in the downstream (DS) direction, Tnew is used by the traffic shaper.

314, 316 If the network is extremely lightly utilized, speed up heavy users through assigning them a higher Tmax value (Thi) given by $$\text{Thi} = \text{accl\_factr} * T\text{max},$$

Where the acceleration factor (accl_factr) is evaluated as described below.

Repeat.

The congestion in both the upstream and downstream is evaluated similarly. One possible difference is in choosing the threshold values used to declare a congestion state or the clearance of a congestion state. The following process embodiment may be applied to determine whether the channel is congested or not:

The threshold when the congestion starts is Util_cong_start (Tcs).

The threshold when the congestion ends is Util_cong_end ($Tc_E$).

The threshold that represents the start of the normal state is Util_norm_start ($T_{NS}$).

The threshold that represents the end of the normal state is Util_norm_end ($T_{NE}$)

The measured channel utilization is Util_current (C).

Figure 1:
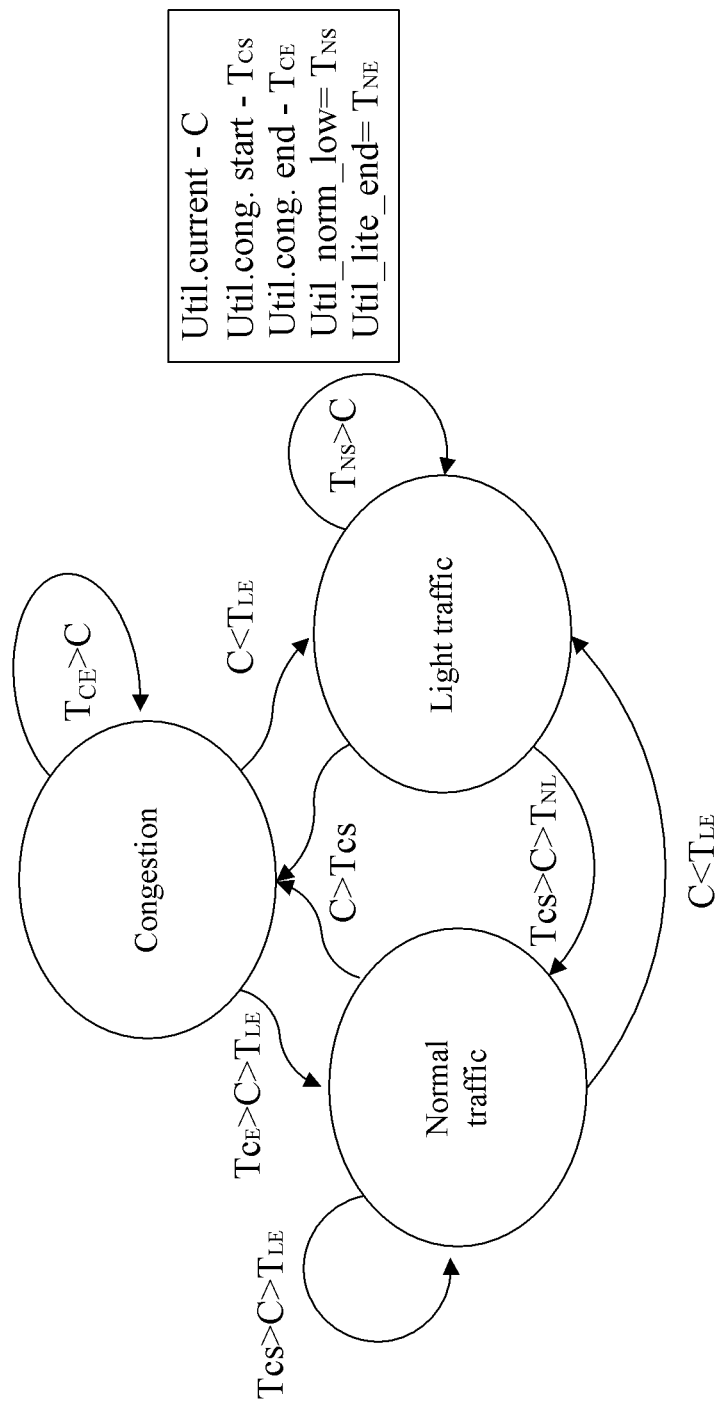
FIG. 1 is an illustration of an embodiment of state machine logic that may be applied to identify whether a channel is congested or not.

The values Util_cong, Util_clear, and Util_current may be applied to identify whether the channel is congested or not every CH_sample minutes according to the state-machine shown in FIG. 1.

Two different threshold values may be utilized to declare the presence/clearance of the congestion. Identification of the congestion state may be modeled as a hysteresis process.

A leaky bucket model may be utilized to identify whether a subscriber (SF) is heavy or not (e.g. once every BKT_sample minutes for each SF). Each SF will have an allowed average rate (Tavg), which is a small value compared to Tmax (e.g., 150 kbps). It is small because it is averaged over a long time, assuming that well-behaved subscribers will be quiet for some time.

Figure 2:
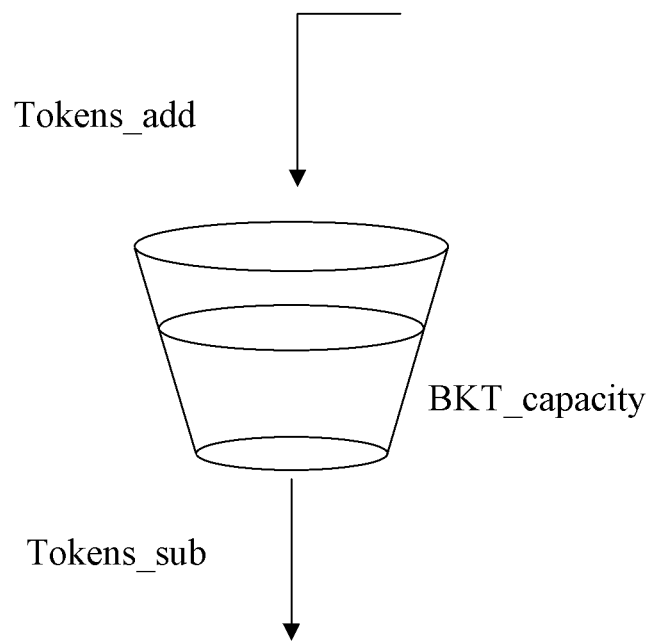
FIG. 2 is an illustration of an embodiment of a bucket model where the bucket size is large to allow for bursting.
Figure 4:
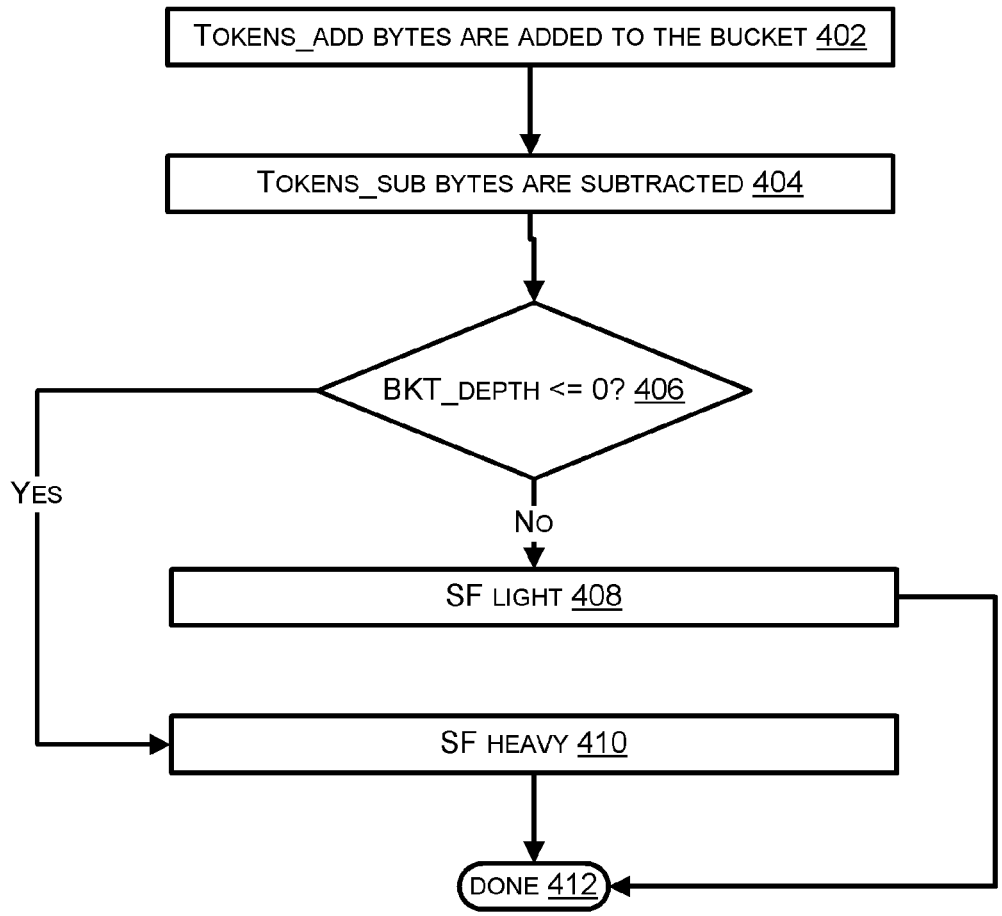
FIG. 4 is a flow chart of an embodiment of a process of classifying a subscriber as heavy or light.

One embodiment of a bucket model is shown in FIG. 2, where the bucket size (BKT_capacity) is a large value to allow for bursting. In one embodiment, every BKT_sample minutes, do the following for each SF (see FIG. 4):

402 Tokens_add bytes are added to the bucket (tokens) as

Tokens_add=$T$avg(b/s)*BKT_sample(min)* 60(s/min)/8(b/byte)=$T$avg*BKT_sample* 60/8 Bytes

404 Tokens_sub bytes are subtracted (subscriber usage equivalent to lost tokens as Tokens_sub=current byte count− last byte count (Byte_last)

406, 408, 410 If the number tokens in the bucket (current bucket depth, BKT_depth) is 0 or negative, then the user is heavy. Otherwise, he is light. Note that the bucket is allowed to go negative.

When a subscriber is identified as heavy and when the channel is congested, the subscriber is assigned a new Tmax value given by Tnew=Hvnss_level*Tmax, where Hvnss_level is a fraction to be determined based on how heavy the subscriber is.

A subscriber is identified as heavy if his leaky bucket has 0 or negative tokens. In one embodiment Hvnss_level is determined by how negative the bucket is (i.e., how heavy the subscriber is) according to Table 1 shown below, where $T_1$ through $T_3$ are adjustable numbers.

TABLE 1

Estimating the fraction Hvnss_level needed to calculated Tnew

| Tokens in bucket | Hvnss_level |
|---|---|
| 0 to −T1 | 0.5 |
| −T1 to −T2 | 0.25 |
| −T2 to −T3 | 0.125 |
| −T3 or less | 0.05 |

When a subscriber is identified as heavy and when the channel is lightly or extremely lightly utilized, the subscriber is assigned a higher Tmax value given by Thi=accl_factr*Tmax, where accl_factr is a value greater than 1 to be determined based on how lightly the channel is utilized. A subscriber is identified as heavy if his leaky bucket has 0 or negative tokens. In one embodiment, accl_factr is determined based on the utilization of the channel according to Table 2 shown below, where $X_1$ (e.g., 5%) through $X_3$ (e.g., 15%) are adjustable numbers.

TABLE 2

Estimating the factor accl_factr needed to calculated Thi

| Utilization (%) | accl_factr |
|---|---|
| 0 to X1 | 3 |
| X1 to X2 | 2.0 |
| X2 to X3 | 1.5 |

The following are parameters that may be controlled and/or adjusted by the customers/vendor before employing the ITO feature:

CH_sample: Time in minutes between successive samples for the channel utilization counts.

BKT_sample: Time in minutes between successive token bucket updates for each SF.

Util_cong_start, Util_cong_stop, Util_norm_low, and Util_lite_end.

Tavg: The allowed average rate.

$T_1$, $T_2$, and $T_3$: Positive numbers used to set ranges corresponding to different heaviness levels.

$X_1$, $X_2$, and $X_3$: Positive numbers used to set ranges corresponding to different acceleration factors.

The following parameters are maintained for each SF:

BKT_capacity: The capacity of the token bucket.

Tavg: The allowed average rate.

BKT_depth: the current depth of the token bucket.

Byte_last: The last byte count reading.

It may also be desirable to maintain the previous state of the channel of being congested or not because the next state depends on the previous one according to the state machine.

It may be desirable for the operator to have a document trail for any actions taken to alter a user's broadband experience. Each time the state machines alter a user's Tmax value, the operator may have the option of recording that service change in a log, billing record, or other interface for later retrieval. This would allow the operator to document actual actions taken if the need arose at some later time.

The granularity of the ITO may be improved to render a more seamless user experience. For example, instead of a single set of fixed thresholds, the thresholds could retain more historical information so that a user who had not been a heavy user usually, would not have his service impacted as much as a user who was chronically a heavy user. This could be done by allowing the BKT_capacity to vary with time. The Hvnss_level could also be adjusted per user in light of past behavior.

A more intelligent algorithm could also update the Hvnss_level and BKT_capacity values more or less continually to attempt to provide best possible service levels for as many users as possible. For example, if the channel is just barely in congestion, only making small adjustments to the very heaviest users may be enough to ensure adequate quality of service. Alternately, if there are many users all with reasonably traffic levels, but the channel is still being forced into congestion, service level adjustments may be necessary for a large number of users to improve the quality of experience for everyone.

Those having skill in the art will appreciate that there are various logic implementations by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A method of assigning bandwidth to a subscriber of a data network, comprising:
    applying logic of one or more network devices to sample bits of information communicated over a network communication medium to identify if there is a network congestion condition or if utilization of the network communication medium is below a preset low utilization level;
    applying logic of the one or more network devices to lower a maximum bandwidth assigned to the subscriber below a normative maximum bandwidth assigned to the subscriber if the data network is congested and the logic of the one or more network devices identifies the subscriber as a heavy bandwidth user; and
    applying logic of the one or more network devices to raise the maximum bandwidth assigned to the subscriber above the normative maximum bandwidth assigned to the subscriber only if both of the preset low utilization level of the network communication medium is identified and the subscriber is the heavy bandwidth user.

2. The method of claim 1, further comprising:
    applying logic of the one or more network devices to measure network utilization over a network sample period.

3. The method of claim 1, further comprising:
    applying logic of the one or more network devices to count, sequentially over a subscriber sample period, a number of bits communicated by multiple subscribers.

4. The method of claim 1, further comprising:
    setting values in memory locations of the one or more network devices, according to $Tnew = Hvnss\_level * Tmax$; and
    where Tnew represents a lowered maximum bandwidth assigned to the subscriber, Hvnss_level represents a fraction, and Tmax represents the normative maximum bandwidth assigned to the subscriber.

5. The method of claim 1, further comprising:
    setting values in memory locations of the one or more network devices, according to $Thi = accl\_factr * Tmax$; and where Thi represents a raised maximum bandwidth assigned to the subscriber, accl_factr represents an acceleration factor, and Tmax represents the normative maximum bandwidth assigned to the subscriber.

6. The method of claim 1, further comprising:
sampling, with a logic device, the bits of information that are communicated over the network communication medium by the subscriber during a subscriber sample period;
associating a bucket model logic structure associated with the subscriber;
measuring a quantity of bits added to the bucket model logic structure over the subscriber sample period;
measuring a quantity of bits subtracted from bucket model logic structure over the subscriber sample period; and
if a bucket depth of the bucket model logic structure after the subscriber sample period is zero or negative, identifying the subscriber as the heavy bandwidth user.

7. The method of claim 6, further comprising:
setting memory locations of the one or more network devices, according to Tokens_add=Tavg*BKT_sample where Tavg represents an allowed average bandwidth rate for the subscriber and BKT_sample is the subscriber sample period.

8. The method of claim 6, further comprising:
varying a bucket capacity level of the bucket model logic structure over time.

9. A device for assigning network bandwidth to a subscriber of a data network, comprising:
a network traffic monitor comprising logic to sample bits of information communicated over a network communication medium to identify if there is a network congestion condition or if utilization of the network communication medium is below a preset low utilization level;
a network traffic controller comprising logic to lower a maximum bandwidth assigned to the subscriber below a normative maximum bandwidth assigned to the subscriber if the data network is congested and the subscriber is identified as a heavy bandwidth user; and
the network traffic controller comprising logic to raise the maximum bandwidth assigned to the subscriber above the normative maximum bandwidth assigned to the subscriber only if both of the preset low utilization level of the network communication medium is identified and the subscriber is the heavy bandwidth user.

10. The device of claim 9, further comprising:
the network traffic monitor comprising logic to measure network utilization over a network sample period.

11. The device of claim 9, further comprising:
the network traffic monitor comprising logic to count, sequentially over a subscriber sample period, a number of bits communicated by multiple subscribers.

12. The device of claim 9, further comprising:
the network traffic controller comprising logic to set a lowered maximum bandwidth assigned to the subscriber according to Tnew=Hvnss_level*Tmax; and
where Tnew represents the lowered maximum bandwidth assigned to the subscriber, Hvnss_level represents a fraction, and Tmax represents the normative maximum bandwidth assigned to the subscriber.

13. The device of claim 9, further comprising:
the network traffic controller comprising logic to set a raised maximum bandwidth assigned to the subscriber according to Thi=accl_factr*Tmax; and
where Thi represents the raised maximum bandwidth assigned to the subscriber, accl_factr represents an acceleration factor, and Tmax represents the normative maximum bandwidth assigned to the subscriber.

14. The device of claim 9, further comprising:
the network traffic monitor comprising logic to (a) sample, the bits of information that are communicated over the network communication medium by the subscriber during a subscriber sample period, (b) to associate a bucket model logic structure associated with the subscriber, (c), to measure a quantity of bits added to the bucket model logic structure over the subscriber sample period, (d) to measure a quantity of bits subtracted from bucket model logic structure over the subscriber sample period, and (e) if a bucket depth of the bucket model logic structure after the subscriber sample period is zero or negative, to identify the subscriber as the heavy bandwidth user.

15. The device of claim 14, further comprising:
the network traffic monitor comprising logic to adjust the bucket model logic structure according to Tokens_add=Tavg*BKT_sample where Tavg represents an allowed average bandwidth rate for the subscriber and BKT_sample is the subscriber sample period.

16. The device of claim 14, further comprising:
the network traffic monitor comprising logic to vary a bucket capacity level of the bucket model logic structure over time.

* * * * *